March 19, 1929.   H. S. LEWIS ET AL   1,705,932
GEAR WHEEL
Filed Jan. 11, 1928
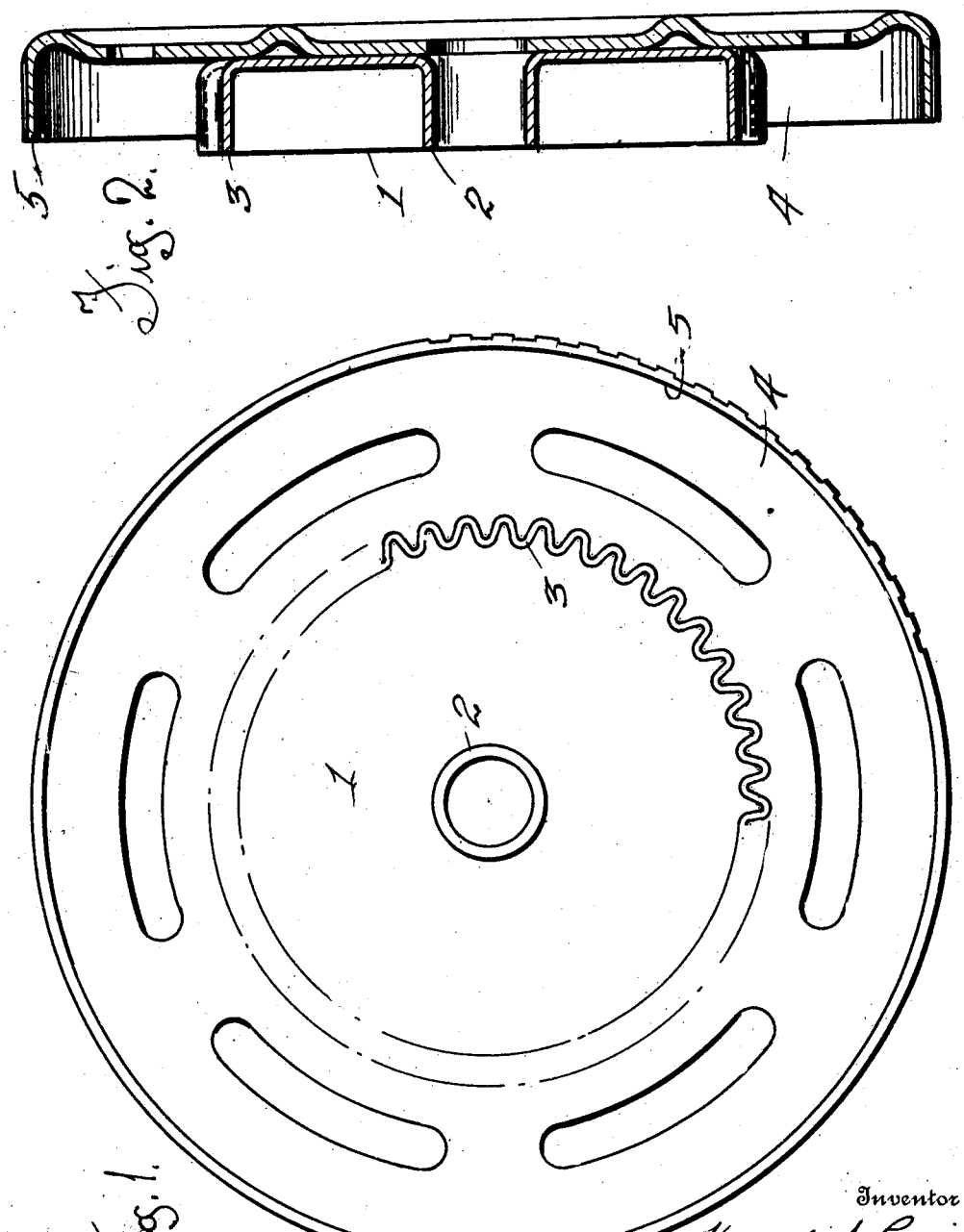

Patented Mar. 19, 1929.

1,705,932

UNITED STATES PATENT OFFICE.

HOWARD S. LEWIS AND CHARLES KACHEL, OF READING, PENNSYLVANIA, ASSIGNORS TO PARISH PRESSED STEEL COMPANY, OF READING, PENNSYLVANIA, A CORPORATION OF DELAWARE.

GEAR WHEEL.

Application filed January 11, 1928. Serial No. 245,964.

This invention relates to improvements in gear wheels, and it pertains particularly to the construction of wheels for use on lawn mowers, in which a toothed inner surface is required to accommodate a co-acting and rotatable member of the machine.

The invention contemplates a lawn mower wheel on which the machine is to be mounted for operation, made of sheet metal, preferably sheet steel, and in which such geared surface is conveniently provided.

To this end we have devised a wheel, pressed from sheet steel, consisting of two members firmly fixed together, and in which the tread or outer member is formed with a flange, and the inner member with a flange, the first serving as a wheel tread and the latter as a wheel hub, while the inner member is provided with an additional flange, which is formed with teeth, providing the geared surface referred to.

The invention is more fully described in the following specification and clearly illustrated in the accompanying drawing, in which:—

Figure 1 is an elevational view showing the inner side of the wheel.

Figure 2 is a central cross-section through Figure 1.

The numeral 1 designates the inner member and is formed with two inwardly pressed flanges, the one forming the hub, 2, of the wheel, and the other flange 3 forming the surface in which the gear teeth are pressed.

The numeral 4 designates the outer member, and this is formed with an inwardly projecting flange, 5, forming the tread of the wheel, and which is suitably serrated.

The two members, when placed into position with relation to each other, as shown in Figure 2, are then fixed together by spot welding at any suitable points where their surfaces contact.

It will be understood that both the inner and outer wheel members are pressed from sheet steel, in the form shown in the accompanying drawings, and they are then fixed securely together to form, as a unitary structure, a light weight, indestructible, internally geared lawn mower wheel.

Having thus fully described our invention, what we claim and desire to secure by Letters Patent is:—

1. A sheet metal internally geared lawn mower wheel, comprising an inner, annularly formed member having two inwardly projecting flanges, the outer one of which is formed with gear teeth and the inner one forming the wheel hub, and an outer member, also of annular form, having an inwardly projecting flange, serrated on its outer surface, to form the wheel tread, the two members being firmly attached to each other by welding, to form a unitary structure.

2. A lawn mower wheel, made of two annularly shaped members pressed from sheet steel, one member having two inwardly projecting flanges, one flange serving as the hub for the wheel and the other or outer flange having a series of gear teeth pressed into it, the other wheel member having an inwardly projecting flange to form the tread of the wheel, the two members being welded together to form a unitary wheel structure.

In testimony whereof we affix our signatures.

HOWARD S. LEWIS.
CHARLES KACHEL.